J. HOUCK.
Cultivator.
No. 19,248.  Patented Feb. 2. 1858.
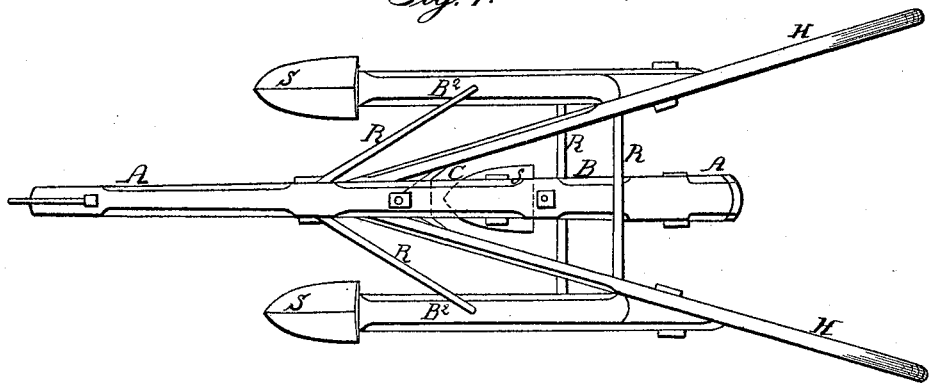
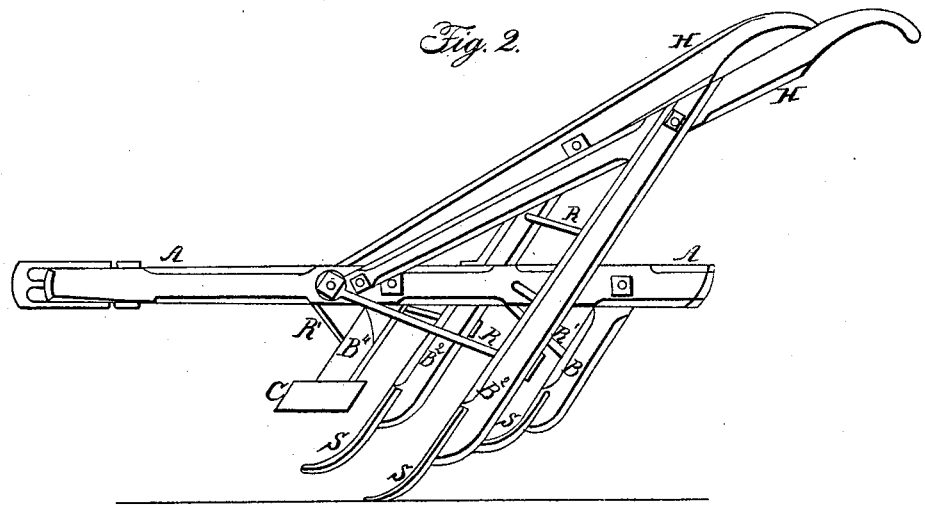

UNITED STATES PATENT OFFICE.

JAMES HOUCK, OF CLINTON, INDIANA.

IMPROVEMENT IN CULTIVATORS.

Specification forming part of Letters Patent No. 19,248, dated February 2, 1858.

*To all whom it may concern:*

Be it known that I, JAMES HOUCK, of the township of Clinton, in the county of Putnam and State of Indiana, have invented a new and useful Improvement in a Machine, called a "Cultivator;" and I do hereby declare that the following is a full, clear, and exact description of the construction and operation of the same, reference being had to the annexed drawings, making a part of this specification, in which—

Figure 1 is a perspective view. Fig. 2 is a sectional view.

A A is a horizontal beam two and one-half by three inches, into which the forward and rear standards or uprights, $B^4$ and B, are framed.

$B^2$ $B^2$ are also uprights, which are attached to the beam A A by means of the rods R R R R, and are framed to the handles H H at the upper end.

C is a triangular mold-board fastened to the forward upright, $B^4$, being made with a point in the center and a wing running each way at a sharp angle, running just at the top of the ground to clear away clods or any obstruction that might otherwise clog the shovels in operating.

As a cultivator, S S S are shovels, which are attached to the uprights B $B^2$ $B^2$, and are about ten inches long by three inches broad, and are made with a sharp ridge in the center running the whole length of the shovel. The point is turned horizontal, so as to form a bearing of about one and three-fourth inch, in order to make it run level and steady. The forward upright can be removed and the rear one can be used either forward or back at pleasure, or the rear one can be moved and the forward one, with the mold-board, substituted, for the purpose of covering corn in planting, by running the two outside shovels on each side of the furrow in which the corn is dropped, the mold-board C following directly over the furrow, removing the clods, and leaving the dirt more even than can be done with a hoe or any other corn-planter.

I do not claim the use of shovels or the mold-board, as they have been long used; but What I do claim is—

The arrangement of the triangular mold-board C and its adjustable standard $B^4$, with relation to beam A, standards B $B^2$ $B^2$, handles H H, and shovels S S, in the manner and for the purpose herein set forth.

JAMES HOUCK.

Witnesses:
J. F. FARLEY,
R. S. RAGAN.